United States Patent [19]

Briccetti

[11] 4,432,030

[45] Feb. 14, 1984

[54] SHORT CIRCUIT PROTECTION SYSTEM

[75] Inventor: Mario F. Briccetti, Liverpool, N.Y.

[73] Assignee: Carrier Corporation, Syracuse, N.Y.

[21] Appl. No.: 362,788

[22] Filed: Mar. 29, 1982

[51] Int. Cl.³ .............................................. H02H 3/24
[52] U.S. Cl. ..................................... 361/92; 364/483
[58] Field of Search ................. 361/92; 364/184, 186, 364/483, 484, 486

[56] References Cited

U.S. PATENT DOCUMENTS

| 3,749,944 | 7/1973 | Luebrecht | 361/92 X |
| 3,769,550 | 10/1973 | Lee | 361/92 |
| 3,836,790 | 9/1974 | Becker | 361/110 X |
| 4,027,204 | 5/1977 | Norbeck | 361/92 X |
| 4,287,565 | 9/1981 | Haubner et al. | 364/186 X |

OTHER PUBLICATIONS

"One-Shot Serving as Missing Pulse Detector Spots Loss of AC Line Voltage Quickly"-Kraengel Electronic Design 5/79.

"Line Voltage Threshold Detector"-Stammely, IBM Technical Disclosure Bulletin, vol. 17, No. 8, 1/75.

*Primary Examiner*—Harry E. Moose, Jr.
*Attorney, Agent, or Firm*—David L. Adour

[57] ABSTRACT

An electrical system which is part of a control system for a heat pump is disclosed. In addition to other functions, the electrical system protects an AC power supply for the control system from a short circuit condition in an electrical load connected to the power supply. The electrical system includes a device for monitoring the voltage drop across the load and for generating an electrical clock signal only when the monitored voltage drop exceeds a selected level indicating no short circuit condition in the load, a microcomputer having an internal timer for receiving any generated clock signal, and relay means controlled by the microcomputer for operating switches to disconnect the AC power supply from the load when a short circuit condition is detected in the load.

1 Claim, 3 Drawing Figures

SHORT CIRCUIT PROTECTION SYSTEM

BACKGROUND OF THE INVENTION

The present invention relates to short circuit protection systems for alternating current (AC) power supplies and more particularly relates to short circuit protection systems for AC power supplies used with electrical controls for heating and/or cooling equipment such as heat pumps.

Normally, an electrical control for heating and/or cooling equipment such as a heat pump, includes a power supply, usually in the form of a transformer, which is selectively connected to output circuits for controlling various functions of the equipment. Usually, the power supply includes a fuse for preventing undesirable, large current flows in the control circuitry if there is a short circuit condition in one of the output circuits. For safety reasons, the fuse is inaccessible and, if the fuse is blown, it is necessary to replace the entire power supply to restore operation of the equipment. This situation may be avoided by using a short circuit protection circuit which protects the power supply and fuse against a short circuit condition in the load.

Short circuit protection circuits for protecting direct current (DC) power supplies from a short circuit condition in a load are well known. These circuits include a resistance device electrically connected in series between the power supply and the load. Current flow through the device is monitored to detect a short circuit condition in the load. An unusually high current flow through the device indicates the existence of a short circuit condition in the load.

A short circuit protection circuit may be included with or added to an electrical control for heating and/or cooling equipment such as a heat pump. If the control utilizes an AC power supply then current sensing protection circuits, similar to the circuits for protecting a DC power supply, may be used to protect the AC power supply from a short circuit condition in a load connected to the AC power supply. However, use of a short circuit protection circuit increases the cost of the control and may reduce the output voltage of the protected AC power supply because of the placement of a resistance device between the power supply and the load. Furthermore, random fluctuations in power supply voltage or frequency, and/or variations in load current may cause undesirable triggering of the protection circuit.

SUMMARY OF THE INVENTION

Therefore, an object of the present invention is to reliably and safely protect an AC power supply from a short circuit condition in a load connected to the power supply.

Another object of the present invention is to protect an AC power supply from a short circuit condition in a load connected to the power supply without reducing the magnitude of the output voltage from the power supply.

A further object of the present invention is to provide a short circuit protection system for an AC power supply which is substantially insensitive to fluctuations in power supply voltage or frequency and to variations in current flow through a load connected to the power supply.

A still further object of the present invention is to reliably and safely protect an AC power supply used in an electrical control for heating and/or cooling equipment, such as a heat pump, from a short circuit condition in a load connected to the power supply.

These and other objects of the present invention are achieved by an electrical system including a device for generating an electrical clock signal in response to a voltage drop across a load connected to an AC power supply, a microcomputer having an internal timer, and relay means controlled by the microcomputer for operating switches to disconnect the AC power supply from the load when a short circuit condition is detected in the load. The load may include a plurality of branch circuits with a switch in each branch circuit electrically connected in series with the AC power supply. The device for generating the clock signal monitors the voltage drop across the load and generates a clock signal only when the monitored voltage drop exceeds a selected level. The clock signal may comprise a series of voltage pulses of predetermined magnitude and duration which are provided to the internal timer of the microcomputer. The internal timer generates a first electrical signal in response to the clock signal and generates a second, different electrical signal at the end of a preselected timer period throughout which no clock signal is detected indicating a short circuit condition in the load. The microcomputer receives a plurality of input signals, including the signals generated by its internal timer, and generates output signals for controlling relays associated with the switches in the branch circuits of the load. These control relays are operated in response to the input signals to the microcomputer according to preprogrammed procedures. If the internal timer generates the second signal, which corresponds to a short circuit condition, then the microcomputer operates the control relays to open the switches to disconnect the load from the power supply.

BRIEF DESCRIPTION OF THE DRAWINGS

Other objects and advantages of the present invention will be apparent from the following detailed description in conjunction with the accompanying drawings wherein like reference numerals identify like elements, and in which.

DESCRIPTION OF THE PREFERRED EMBODIMENT

Figure 1:
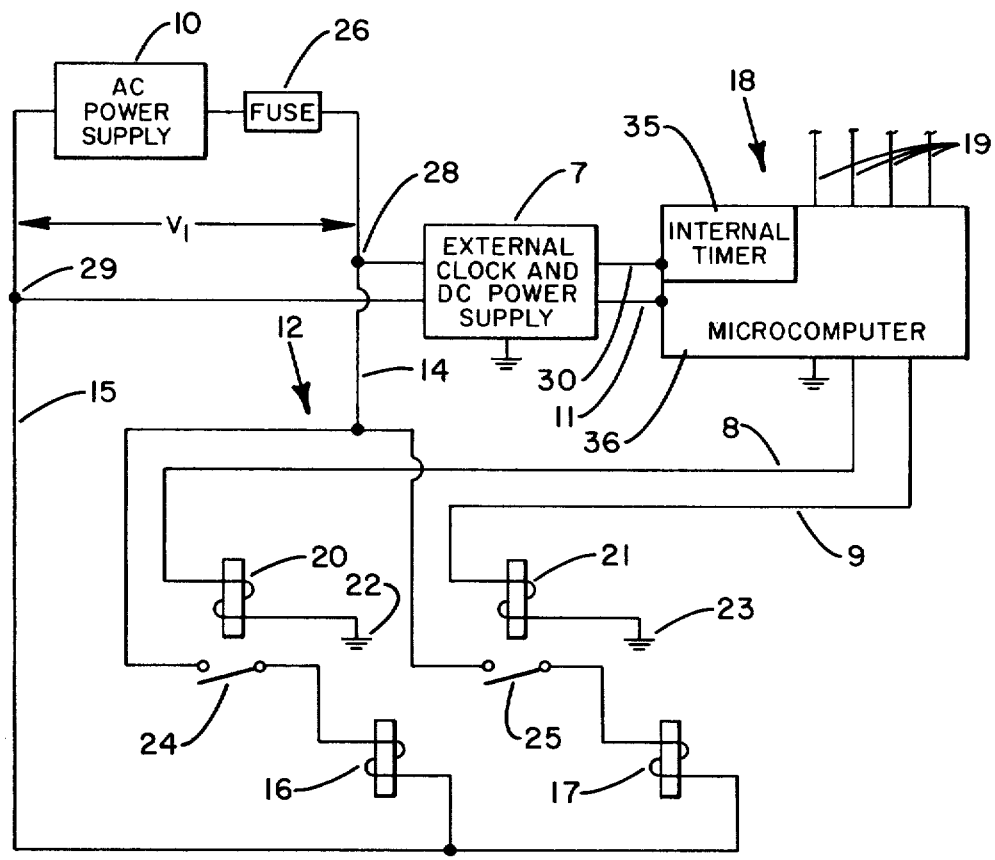
FIG. 1 shows an electrical system, according to the present invention, for protecting an AC power supply from a short circuit condition in a load connected to the power supply.

Referring to FIG. 1, an electrical system, according to the present invention, is shown for protecting an AC power supply 100 from a short circuit condition in an electrical load 12 connected to the power supply 10 by electrical leads 14 and 15. This electrical system may be part of a control system for heating and/or cooling equipment such as a heat pump (not shown). As part of a heat pump control system, a microcomputer 18 receives a plurality of electrical input signals via electrical leads 19 and generates a plurality of electrical output signals in response to the input signals according to preprogrammed procedures. The electrical input signals to the microcomputer 18 may represent parameters such as outdoor temperature, indoor thermostat setting, and outdoor coil temperature of the heat pump. The electrical output signals from the microcomputer 18 actuate control relays 20 and 21 via electrical leads 8 and 9, respectively. The control relays 20 and 21 operate switches 24 and 25, respectively, to control current flow from the AC power supply 10 to power relays 16 and 17, respectively. The power relays 16 and 17 control various functions of the heat pump such as operation of the compressor motor and position of the four-way valve of the heat pump. Control relays 20 and 21 are not used to directly control heat pump functions because power circuits normally are electrically isolated from control circuits for safety and other reasons.

As shown in FIG. 1, the microcomputer 18 has four input electrical leads 19 and input electrical leads 11 and 30 from external clock and DC power supply 7. Also, the microcomputer 18 has two output electrical leads 8 and 9 electrically connected to control relays 20 and 21, respectively. However, it should be noted that the microcomputer 18 may have any number of input electrical leads and any number of output electrical leads depending on the capabilities of the particular microcomputer which is used as microcomputer 18. For example, the microcomputer 18 may be a model 3870 single chip microcomputer, manufactured by Mostek Corporation of Carrollton, Tex., or a similar type of microcomputer capable of processing a relatively large number of input signals and generating a relatively large number of output signals.

Furthermore, as shown in FIG. 1, load 12 comprises two branch circuits having power relays 16 and 17 operated by switches 24 and 25, respectively. However, it should be noted that load 12 may comprise any number of branch circuits with each branch circuit having an associated control relay operated by the microcomputer 18. In addition, it should be noted that it is not necessary to provide each branch circuit of the load 12 with a switch and associated control relay if it is desired not to protect the AC power supply 10 against a short circuit condition in that particular branch circuit.

As schematically shown in FIG. 1, the relays 20 and 21 are connected to circuit common at points 22 and 23, respectively. However, it should be understood that circuit common connections may be physically made at the microcomputer 18 or other such convenient location. In fact, all the electrical components shown in FIG. 1 operate relative to circuit common, as is well understood in the art of electrical system design, but for clarity and convenience, as is normally done in the art, these circuit common connections are not always shown or are shown schematically rather than being shown as actual physical connections.

The AC power supply 10 may be a transformer having an inaccessible fuse 26. In an AC powered heat pump control system, such a transformer is normally provided to convert utility line power to twenty-four volt AC power used by the heat pump control system. For safety reasons, the fuse 26 is surrounded by the windings of the transformer to make the fuse 26 inaccessible so that the heat pump cannot be operated with a transformer having a bypassed fuse. If the fuse 26 is blown, then it is necessary to replace the power supply 10 to restore operation of the control system for the heat pump.

Figure 2:
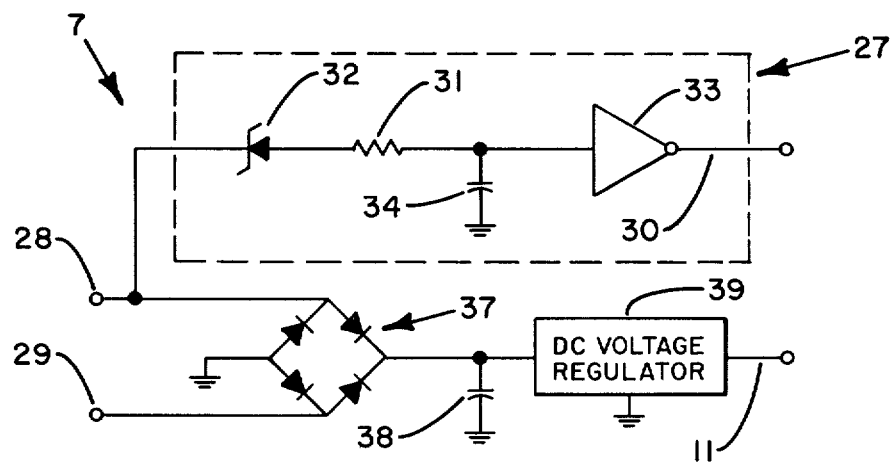
FIG. 2 illustrates electrical components which may comprise the external clock and DC power supply shown in FIG. 1.

In addition to supplying power to the power relays 16 and 17, as shown in FIG. 1, the power supply 10 may power other circuit components of the heat pump control system. For example, as shown in FIG. 2, the power supply 10, through appropriate power conditioning circuitry, may power the microcomputer 18. Of course, if desired, the microcomputer 18 and other electrical components of the control system may be powered by a separate power supply or several, different power supplies.

FIG. 2 illustrates electrical components which may comprise the external clock and DC power supply 7 when the microcomputer 18 is a model 3870 microcomputer manufactured by Mostek Corporation. As shown in FIG. 2, the external clock 27 comprises a Zener diode 32, a resistor 31, a capacitor 34, and an inverting amplifier 33. The DC power supply comprises a full wave diode bridge rectifier 37, a filter capacitor 38, and a fixed output voltage regulator 39 such as a model MC7805CT, five-volt DC voltage regulator manufactured by the Electronic Components Division of the Motorola Corporation of Chicago, Ill. The resistor 31 and capacitor 34 provide high frequency filtering to eliminate spurious electrical signals which may be generated in the electrical system by electrical noise sources external to the system. The Zener diode 32 and inverting amplifier 33 condition the monitored AC signal of the power supply 10 to provide voltage pulses to the microcomputer 18 which are capable of being processed by the microcomputer 18 according to its programming. The electrical components shown in FIG. 2 are only one example of an external clock 27 which may be used with the model 3870 microcomputer manufactured by Mostek Corporation. Other electrical components for the external clock 27 will be readily apparent to one of ordinary skill in the art and a different kind of microcomputer 18 may require a different type of external clock 27.

The AC power supply 10 is protected against a short circuit condition in the load 12 by operation of the external clock 27, microcomputer 18, and control relays 20 and 21. The external clock 27 is connected to monitor voltage drop across the load 12. There is no output drive reduction penalty for the power supply 10 because the external clock 27 provides substantially no resistance between the load 12 and the power relays 16 and 17. The external clock 27 generates a clock signal only when the monitored AC voltage drop is above a selected level indicating no short circuit condition in the load 12. The monitored AC voltage drop across the load 12 is indicative of a short circuit condition in the load 12 because if a short circuit condition exists in any one of the branch circuits then there is no significant AC voltage difference (drop) between points 28 and 29. If there is no short circuit condition in the load 12 then there is a significant, measurable AC voltage drop across the load 12.

Electrical clock signals from the external clock 27 are supplied to the internal timer 35 of the microcomputer 18 via electrical lead 30. The external clock 27 acts as a signal processor to convert the monitored AC signal to a corresponding digital signal which may be inputted to the internal timer 35 of the microcomputer 18. Normally, a microcomputer cannot directly monitor and process the output from a 24 volt AC power supply.

The internal timer 35 generates a first level voltage signal in response to a clock signal supplied at the input lead 30 to the timer 35. A different second level voltage signal is generated by the internal timer 35 after a preselected time duration throughout which no clock signal is supplied to the timer 35 via the input lead 30. The time duration is selected so that generation of the second level voltage signal corresponds to the existence of a short circuit condition in a branch circuit of the load 12. Also, the time duration is selected to protect the AC power supply 10 from a short circuit condition before the fuse 26 blows and to prevent operation of the protection system in response to spurious electrical noise. Although it is convenient to use an internal timer 35 normally found in a microcomputer 18, such as the model 3870 microcomputer manufactured by Mostek Corporation, it is possible to construct the internal timer 35 external of the microcomputer 18 if desired.

In addition to sensing the voltage signals supplied by the input leads 19 to the microcomputer 18 a logic section 36 of the microcomputer 18 senses the voltage signals generated by the internal timer 35. The logic section 36 of the microcomputer 18 is programmed to respond to a second level voltage signal generated by the internal timer 35 to generate an alarm control signal at each output lead 8 and 9 from the microcomputer 18. Preferably, the alarm control signal actuates control relays 20 and 21 to open switches 24 and 25, respectively, to disconnect the load 12 from the power supply 10 when a short circuit condition is detected in the load 12. This disables the power relays 16 and 17 and essentially shuts down the control system for the heat pump. However, the microcomputer 18 may be programmed to respond to a detected short circuit condition in other ways. For example, the microcomputer 18 may be programmed to operate the control relays 20 and 21 to open the switches 24 and 25 for a test period and then to close the switches 24 and 25 in an attempt to resume normal operation of the control system. If the short circuit condition in the load 12 was a temporary phenomenon then the control system will resume normal operations after the test period. However, if the short circuit condition in the load 12 still exists after the test period then the microcomputer 18 may respond by opening the switches 24 and 25 to shut down the control system.

Figure 3:
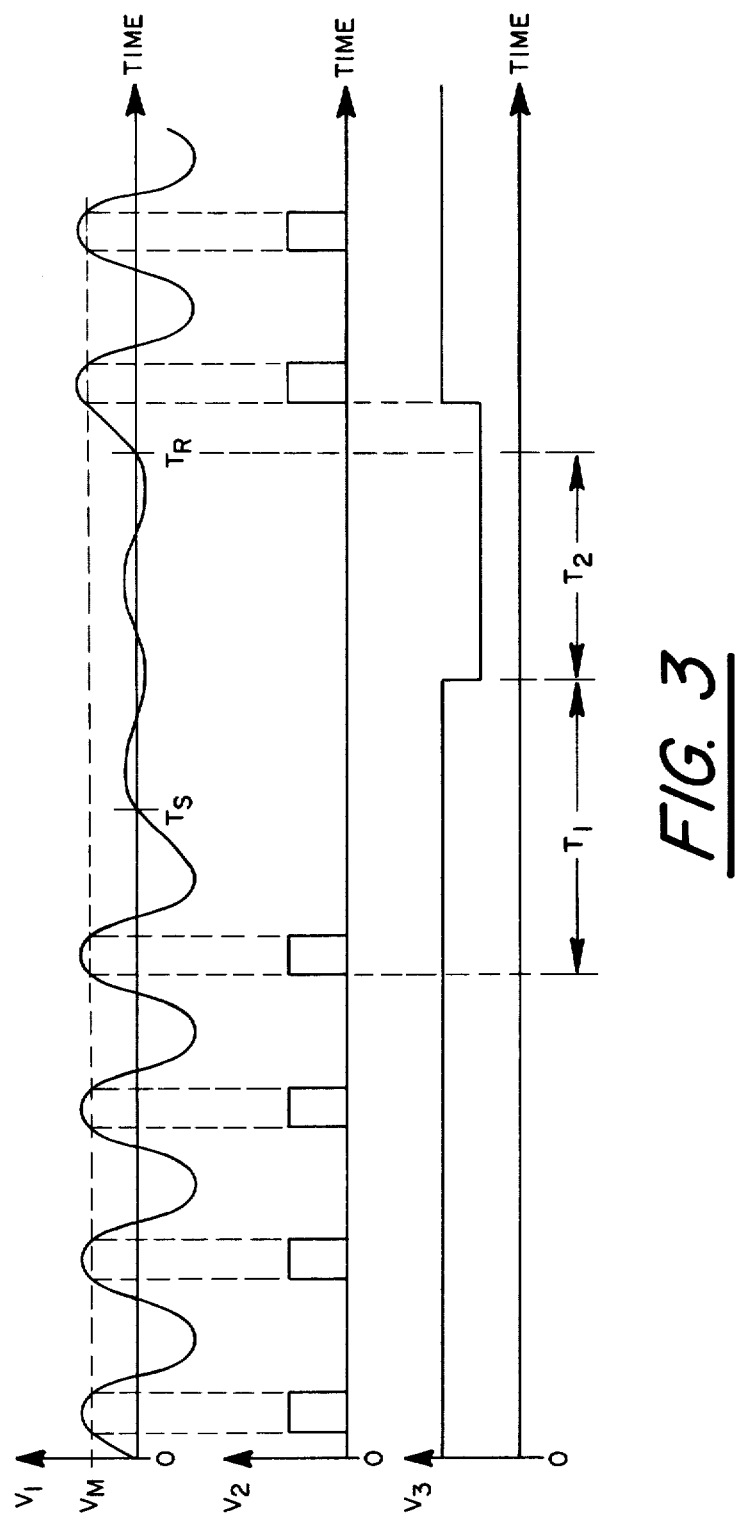
FIG. 3 illustrates examples of voltage signals, as a function of time, which may be present in the electrical system of FIG. 1 during operation of the system under certain conditions.

FIG. 3 illustrates examples of voltage signals, as a function of time, which may be present in the electrical system of FIG. 1 during operation of the system under certain conditions with a 60 hertz, twenty-four volt, AC power supply 10. The top graph represents an AC voltage signal, $V_1$, corresponding to voltage drop across the load 12 between the points 28 and 29 shown in FIG. 1. From time zero to time $T_S$ the system is operating normally. Then, beginning at time $T_S$, a short circuit condition exists in the load 12 until time $T_R$ when normal operation of the system is resumed.

The middle graph of FIG. 3 represents a clock signal which may be generated by the external clock 27 in response to the AC voltage signal, $V_1$, shown by the top graph. The external clock 27 monitors the AC voltage drop, $V_1$, between the points 28 and 29 and generates a voltage pulse each time the AC voltage signal, $V_1$, exceeds a selected voltage level, $V_M$. The duration of each pulse is determined by the amount of time the AC voltage, $V_1$, exceeds the level $V_M$ for each cycle of the AC signal, $V_1$. Thus, if the power supply 10 is a 60 hertz, AC source then the clock signal generated by the clock 27 is a periodic series of voltage pulses having a sixty hertz frequency when there is no short circuit in the load 12. If there is a short circuit then no clock signal will be generated since the AC voltage, $V_1$, does not exceed $V_M$.

The bottom graph of FIG. 3 represents a voltage signal, $V_3$, which may be generated by the internal timer 35 and supplied to the logic section 36 of the microcomputer 18, in response to a clock signal, $V_2$, as represented by the middle graph of FIG. 3. The time period or duration, $T_1$, represents the amount of time required for the internal timer 35 to "timeout". This timeout period is the selected time period after which the internal timer 35 alters its output voltage signal, $V_3$, from a first, high level signal to a second, lower level signal, as shown in FIG. 3, in response to absence of the clock signal, $V_2$, indicating a short circuit condition in the load 12. The time period or duration $T_2$ represents the response time of the control relays 20 and 21 and switches 24 and 25 to disconnect the load 12 from the power supply 10 in response to generation of the second, lower level voltage signal, $V_3$, by the internal timer 35 and subsequent generation of the alarm control signal by the microcomputer 18. The internal timer signal, $V_3$, returns to its first, high level in response to the first voltage pulse of signal $V_2$ generated after time $T_R$ when the electrical system resumes normal operation after a short circuit condition.

The impedance of the power supply 10, the blow time of the fuse 26, and the period $T_1$ of the internal timer 35 are selected so that the fuse 26 does not blow before the electrical system senses a short circuit condition in the load 12 and takes appropriate action. Also, these parameters and $V_M$ are selected so that electrical noise does not inadvertently actuate the electrical system into its short circuit protection mode of operation. In general, for a sixty hertz, twenty-four volt, AC power supply 10 if the electrical system senses and acts on a short circuit condition in a range of 3 to 6 electrical cycles then the system will be substantially insensitive to noise and will protect conventional fuses for the power supply 10. Furthermore, it should be noted that the electrical protection system is substantially insensitive to fluctuations in voltage or frequency of the power supply 10 and to variations in current flow through the load 12 since the system is not directly keyed to these parameters.

Finally, while the present invention has been described in conjunction with a particular embodiment it is to be understood that various modifications and other embodiments of the present invention may be made without departing from the scope of the invention as described herein and as claimed in the appended claims.

What is claimed is:

1. An electrical system for protecting an AC power supply, which is part of an electrical control system for heating and/or cooling equipment, from a short circuit condition in a load having a plurality of branch circuits which are each electrically connected in series with the AC power supply and which are electrically connected in parallel to each other, comprising:
   a switch means, electrically connected in series with each branch circuit in which it is desired to protect against a short circuit condition, for selectively connecting each branch circuit to the AC power supply;
   a clock means for monitoring voltage drop across the load and for generating a clock signal only when the monitored voltage drop exceeds a selected voltage level;
   a relay means, associated with each switch means in a branch circuit, for receiving electrical control signals and for opening the associated switch means to disconnect the branch circuit from the AC power supply when no electrical control signal is received by said relay means and for closing the associated switch means to connect the branch circuit to the AC power supply when an electrical control signal is received by said relay means; and a microcomputer system for detecting the clock signal generated by the clock means, for generating and supplying an electrical control signal to each relay means when the clock signal generated by the clock means is detected by said microcomputer system, for temporarily shutting down operation of the AC power supply by temporarily discontinuing the supply of electrical control signals to all of the relay means after a preselected time interval during which no clock signal is detected by said microcomputer, for automatically testing the branch circuits, after a temporary operational shut down of the AC power supply, by generating and supplying electrical control test signals to selected relay means according to preprogrammed procedures and by monitoring the operation of the branch circuits when the test signals are supplied to the selected relay means to detect a short circuit condition in the branch circuits, and for completely shutting down operation of the AC power supply by completely discontinuing the supply of electrical control signals to all of the relay means if the automatic testing by said microcomputer system detects a short circuit condition in the branch circuits.

* * * * *